Dec. 1, 1959 H. E. HENDRIKS 2,914,862
STRIKE-DIP MEASURING AID
Filed May 28, 1957
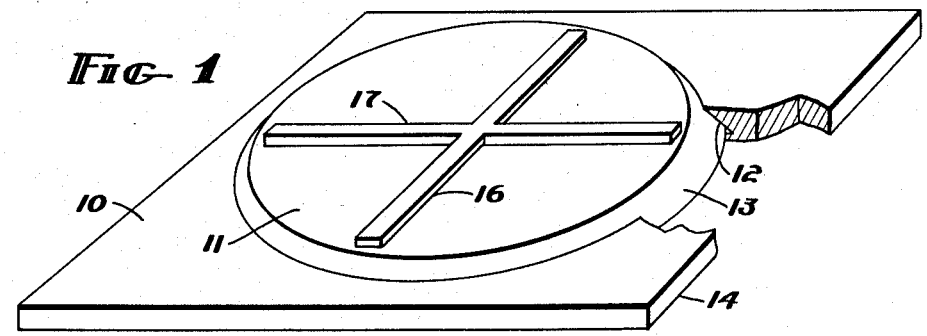
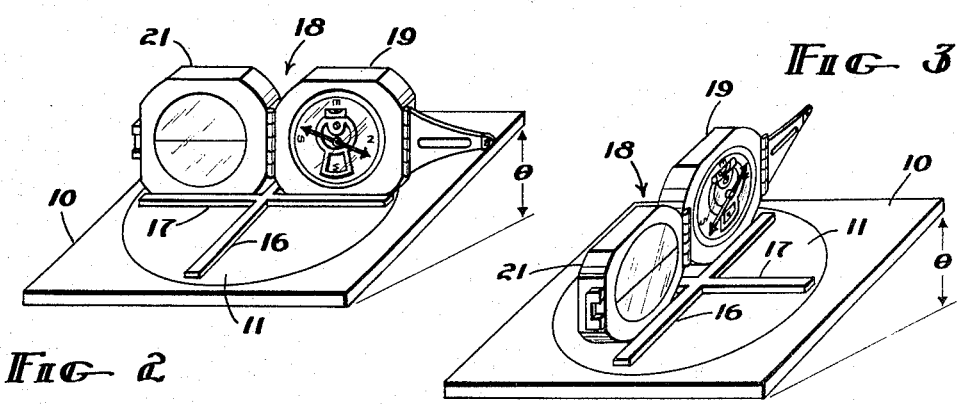
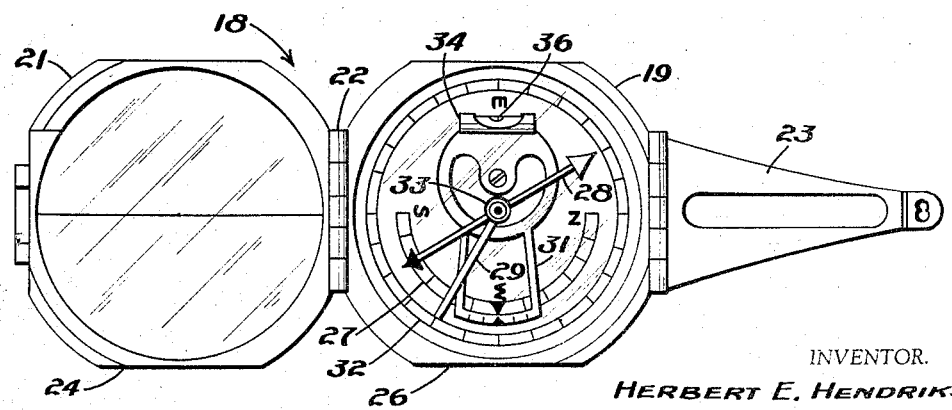
INVENTOR.
HERBERT E. HENDRIKS
BY Marin Moody
ATTORNEY

2,914,862

STRIKE-DIP MEASURING AID

Herbert E. Hendriks, Mount Vernon, Iowa

Application May 28, 1957, Serial No. 662,281

1 Claim. (Cl. 33—204)

This invention relates in general to a strike-dip aid and in particular, to a device which when used with a compass and level allows the user to find the strike and the dip.

Geologists find it necessary at times to determine the strike and dip of various strata. The strike is the compass direction of a level line on the surface of a sloping stratum of bedrock. The dip is the angle of maximum inclination of the stratum from the horizontal, measured in a vertical plane at right angles to the strike direction.

It is an object of the present invention to provide a measuring aid for use with a compass and level to determine the strike and dip.

Another object is to provide a method of determining the strike and dip of sloping bedrock strata.

It is an object of this invention to provide a strike and dip measuring device which comprises a disc rotatably mounted in a flat sheet of material and with a pair of cleats attached to the disc and mounted at right angles to each other and usable with a compass and level device to determine the strike and dip of a sloping stratum.

Further objects, features and advantages of this invention will become apparent from the following description and claim when read in view of the drawings in which:

Figure 1 is a cut-away view of the strike-measuring aid of this invention;

Figure 2 illustrates the method of determining the strike with this invention;

Figure 3 illustrates the method of determining the dip of a stratum with this invention; and Figure 4 illustrates a compass, level and inclinometer instrument which can be used with this invention.

Figure 1 illustrates a plate 10 which might be made of a plastic or other suitable non-magnetic material, for example, and which is formed with an annular opening which is undercut as designated by numeral 12. A disc 11 is rotatably mounted in the annular opening and is formed with a beveled edge 13 which engages the portion 12. The disc 11 may be mounted to the base plate 10 by glueing two layers together with the disc 11 held therebetween, for example. The underside of the base plate 10 is roughened so that it will not easily slide on the rock stratum.

A pair of cleats 16 and 17 are mounted to the upper surface of disc 11 at right angles to each other and so as to intersect at the center of the disc. The disc 11 is also made of nonmagnetic material.

Thus the structure shown in Figure 1 comprises a base plate 10 with a rotatable disc 11 mounted therein and the disc 11 has the cleats 16 and 17 attached at right angles to each other. This device may be used with a geologist's compass, as for example, a Brunton pocket transit commonly used by a geologist. As best shown in Figure 4 such a compass designated generally as 18 comprises a pair of octagonal portions 19 and 21 which are hinged together by a hinge 22 and has a pivoting side arm 23 used for running lines. A magnetic compass needle 28 is supported by a pivot 33 and a locking arm 29 is provided for locking the magnetic needle 28 when the compass is not in use so as to prevent it from banging around. The compass needle is read against the compass rose 22. An inclinometer 31 is pivotally supported by the compass and may be adjusted by a lever, not shown, mounted on the rear of the compass, not shown. The inclinometer has a level 34 mounted thereon which has a bubble 36 therein. The lower end of the inclinometer has an indicia which may be read against a scale 27.

The lower edge of portion 21 is designated by the numeral 24 and the lower edge of portion 19 is designated by the numeral 26.

The compass shown in Figure 4 is used with a plate and disc as shown in Figure 1 to determine the strike and dip of a sloping strata. In use the plate 10 is placed with the disc side up on the surface for which the strike and the dip are to be determined. The inclinometer 31 of the compass is set by the lever, not shown, to the zero inclination point. Under this condition the bubble 36 will be centered when the sides 24 and 26 are mounted on a level line.

The compass is placed on the disc against the cleat 17 as shown in Figure 2. It is to be noted that portions 19 and 21 follow on opposite sides of the cleat 16. The disc 11 is rotated until the bubble 36 is centered. When the bubble is centered the cleat 17 will be parallel to a strike line on the stratum to be tested. The compass is then laid on its back with its edges 24 and 26 against the cleat 17 and the direction of the strike can be read by the needle 28 against the compass rose 32.

To obtain the dip or inclination of the strata being measured the compass is mounted as shown in Figure 3 with the sides 24 and 26 against the cleat 16. The inclinometer 31 is then rotated by the lever, not shown, until the bubble 36 is centered on the level 34. The inclinometer 31 may then be read directly against the scale 27 to obtain the dip of the stratum. This is the angle $\theta$.

It is seen that this invention provides a novel method and structure for determining the strike and dip of a sloping stratum.

Although this invention has been described with respect to a particular modification it is not to be so limited as changes and modifications which are within the full intended scope of the appended claim are covered.

I claim:

The method of measuring the strike and dip of a sloping stratum comprising, placing a base plate with a rotating disc having a pair of cleats at right angles mounted thereon on the stratum to be measured, placing a level against one of the cleats and rotating the disc until the level indicates "level," placing a compass parallel to the level cleat to read the strike, and placing an inclinometer parallel to the other cleat and on the disc to measure the dip.

References Cited in the file of this patent

UNITED STATES PATENTS

| | | |
|---|---|---|
| 1,392,756 | Gahan | Oct. 4, 1921 |
| 2,480,914 | Gallington et al. | Sept. 6, 1949 |

FOREIGN PATENTS

| | | |
|---|---|---|
| 280,334 | Germany | Nov. 12, 1914 |
| 354,657 | Great Britain | Aug. 13, 1931 |
| 82,095 | Sweden | Nov. 27, 1934 |
| A19,978 | Germany | Dec. 13, 1956 |